United States Patent [19]

Nield

[11] 4,322,335

[45] Mar. 30, 1982

[54] FAST CRYSTALLIZING BLOCK COPOLYESTER COMPOSITION

[75] Inventor: Eric Nield, Watton-at-Stone, England

[73] Assignee: Imperial Chemical Industries Limited, London, England

[21] Appl. No.: 184,975

[22] Filed: Sep. 8, 1980

[30] Foreign Application Priority Data

Sep. 21, 1979 [GB] United Kingdom ............... 32818/79

[51] Int. Cl.$^3$ .......................... C08K 3/40; C08L 67/02
[52] U.S. Cl. ................................... 523/522; 525/176; 525/408; 523/523
[58] Field of Search ................ 525/176, 408; 528/301; 260/40 R

[56] References Cited

U.S. PATENT DOCUMENTS

| | | | |
|---|---|---|---|
| 3,435,093 | 3/1969 | Cope | 525/176 |
| 3,639,527 | 2/1972 | Brinkman et al. | 525/176 |
| 4,116,925 | 9/1978 | Brachman et al. | 260/42.18 |
| 4,130,603 | 12/1978 | Tanaka et al. | 525/408 |

FOREIGN PATENT DOCUMENTS

| | | | |
|---|---|---|---|
| 486 | 2/1980 | European Pat. Off. | 525/176 |
| 2856270 | 7/1979 | Fed. Rep. of Germany | 525/176 |
| 47-34839 | 9/1972 | Japan | 525/176 |
| 54-138055 | 10/1979 | Japan | 525/176 |
| 1458341 | 12/1976 | United Kingdom . | |
| 1505214 | 3/1978 | United Kingdom . | |
| 2015013 | 9/1979 | United Kingdom . | |
| 2015014 | 9/1979 | United Kingdom . | |
| 1565959 | 4/1980 | United Kingdom . | |

OTHER PUBLICATIONS

Chemical Abstracts, vol. 80, No. 4, Jan. 1974, p. 70, No. 16127j.

Primary Examiner—Paul Lieberman
Assistant Examiner—Robert Sellers
Attorney, Agent, or Firm—Cushman, Darby & Cushman

[57] ABSTRACT

A fast crystallizing polyester composition comprising a block copolyester containing the repeating polymeric segments A and B wherein A is a polymeric segment of ethylene terephthalate units and B is a polymeric segment having a glass-transition temperature of less than 0° C. and preferably less than −20° C., the concentration of the segments of B being between 0.05 and 10 mole % of the block copolyester, and a crystallization nucleant which is an at least partially neutralized salt, preferably an alkali metal salt, of a polymer containing pendant neutralizable groups.

7 Claims, No Drawings

FAST CRYSTALLIZING BLOCK COPOLYESTER COMPOSITION

This invention relates to a fast crystallising polyester composition and more particularly to a block copolyester composition containing a major proportion of polyethylene terephthalate units.

The commercial development of polyethylene terephthalate, hereinafter termed PET, as a moulding powder for use in injection moulding machines has been hampered because the cycle time for moulding of dimensionally stable articles is somewhat longer than that for some other plastics of the engineering type. This is primarily due to the fact that the moulded composition does not reach a crystalline condition as rapidly as the other plastics. Premature ejection from the mould of an insufficiently crystallised moulding would mean that the article could continue to crystallise when in service with corresponding volume changes. A further disadvantage of PET is that it requires the moulds to be maintained at a temperature of at least 120° C. in order to achieve satisfactory results. More recently polyethylene terephthalate compositions have been made available which can be moulded more rapidly and at a lower mould temperature. British Patent Publications GB Pat. Nos. 2,015,013 and 2,015,014 describe such compositions containing a substantial quantity of a plasticiser and a polymeric nucleant having pendant carboxyl groups. The plasticiser has the effect of lowering the glass-transition temperature of the PET composition. Added plasticisers may, however, introduce some disadvantages into the composition. For example, the plasticisers may give rise to difficulties during moulding of the composition or may give rise to some deterioration of the properties of the moulding. In addition the most effective plasticisers, in terms of lowering the glass-transition temperature and increasing the crystallisation rate may be so volatile that it is difficult to incorporate them in a practical manner. Compositions based on a copolyester of PET have now been developed which will crystallise rapidly at low mould temperatures without the need to include an external plasticiser.

According to the invention there is provided a fast crystallising polyester composition comprising a block copolyester containing the repeating polymeric segments A and B wherein A is a polymeric segment of ethylene terephthalate units and B is a polymeric segment having a glass-transition temperature of less than 0° C. and preferably less than −20° C., the concentration of the segments of B being between 0.05 and 10 mole % preferably from 0.1 to 5 mole % of the block copolyester, and a crystallisation nucleant which is an at least partially neutralised salt, preferably an alkali metal salt, of a polymer containing pendant neutralisable groups. The neutralisable groups should be sufficiently basic to react with the carboxylic ester groups in the copolyester to form a metal terephthalate species. Preferably the pendant neutralisable groups are carboxylic acid groups. Suitable salts include salts of copolymers of styrene and maleic anhydride, salts of copolymers of olefins and ethylenically unsaturated carboxylic acids or carboxylic acid anhydrides optionally containing non-conjugated dienes and salts of copolymers of acrylate and methacrylate esters and ethylenically unsaturated carboxylic acids or carboxylic acid anhydrides. Suitable ethylenically unsaturated carboxylic acids or anhydrides are, for example acrylic acid, methacrylic acid, maleic anhydride and fumaric anhydride.

The preferred concentration of the polymeric nucleant is between 0.5% and 10% by weight of the total weight of the composition. Concentrations of less than 0.5% of the polymeric nucleants, for example 0.1%, may be used but will require the presence of additional nucleant of a different type to achieve a useful level of nucleation. Concentrations above 10% by weight of the polymeric nucleants used in the invention do not normally show much further improvement in the level of nucleation but the presence of up to 50% of such nucleants may confer additional benefits in other properties such as impact resistance.

The polyesters of the compositions of the invention have a significantly reduced glass-transition temperature but a melting point which is reduced by a much lower extent. The compositions develop sufficient crystallinity for form stability, when crystallised at low mould temperatures, at a much faster rate than the polyester not containing the polymeric segments B but do not have a significantly reduced working temperature in service.

In comparison with the externally plasticised compositions described in British Pat. Nos. 2,015,013 and 2,015,014 the combination of the presence of the low glass transition temperature blocks in the copolymer and the neutralised polymeric nucleant results in improved processing in the compounding extruder together with improved impact strength and less discolouration introduced at the moulding stage.

The polymeric segments of type B preferably have a molecular weight in the range 500 to 10,000 and is desirably between 1000 and 5000. The polymer used must be capable of undergoing polycondensation with the segments of PET through reactive end groups such as hydroxyl or carboxyl groups or of being linked to PET segments by the use of chain extenders. They must be thermally and chemically stable under the conditions necessary to form the block copolymer. Typically suitable as the precursors for the segments of B are polyethylene glycol, polyethylene adipate, polypropylene glycol, polybutylene glycol, polybutylene adipate, polycaprolactone, polydecamethylene glycol, polyethylene sebacate, polyethylene azelate and polyoxydiethylene sebacate.

The block copolyester used in the invention may be obtained from monomeric constituents of PET and the precursors of segment B by conventional means. For example, copolymers may be made by heating dimethyl terephthalate, ethylene glycol and the precursor in the presence of an appropriate catalyst at about 200° C. until ester interchange is complete and thereafter heating at 275° C. to effect the polycondensation. Alternatively, a preformed polymer of the polyester or a polyester diol can be compounded under melt conditions with an appropriate reactive precursor. Chain extenders, such as isocyanates, epoxides, phenyl esters and carbonates, may also be included in a melt compounding process. The melt compounding process is also useful for preparing block copolyesters having various concentrations of the segment B from copolyesters having a higher concentration of segment B. In this "let-down" process PET may be melt blended, for example, with a copolyester of PET containing 10 mole % of polyethylene oxide segments to give a copolyester containing a polyethylene oxide concentration which has been reduced in proportion to the total concentration of ethylene terephthalate units in the final composition.

As with other crystallisable materials the maximum rate of crystallisation is developed when nucleation sites are present in the crystallising mixture. A wide variety of nucleants are known for this purpose but the polymeric nucleants specified above are particularly suitable when optimum impact strength is required in the polyester composition. Finely divided inorganic materials give a lower nucleating efficiency than the polymeric nucleants used in the composition of the invention.

The compositions are particularly useful for use in engineering applications when they contain particulate or fibrous fillers because these materials can significantly enhance the mechanical properties of the composition. Of the fibrous fillers, glass fibre is most widely used and are commercially available in a variety of types. The most suitable type for giving optimum levels of mechanical properties will depend to a significant extent on the nature of the size applied to the glass. Manufacturers of glass fibres apply a variety of sizes for promoting bonding between the polymer and the glass. The most suitable glass may be chosen by examination of the properties obtained when the glass is incorporated in the composition or the advice of the glass fibre manufacturer may be sought to obtain a fibre suitable for use in polyester compositions. Suitable glasses are OCF 277B or OCF 419AA, obtainable from Owens Corning Fibreglas. The compositions may contain from 5 to 80% by weight of the composition of glass fibre.

The composition may additionally, or alternatively, contain a variety of mineral fillers such as clays, mica, calcium metasilicate, glass beads, pulverised fuel ash and hollow glass spheres and other materials which act not only as cheap fillers but also significantly enhance some mechanical properties of the composition. As with the glass fibre it is advantageous to use fillers which have been surface treated with adhesion-promoting materials such as silanes.

Whilst fast crystallising polyester compositions can be obtained in the absence of any external plasticisers, the compositions of the invention include those in which external plasticisers may be present.

In addition the compositions of the invention may include colourants, mould release agents, flame retardants, ultra-violet light stabilisers and stabilisers against thermal or oxidative degradation.

The fast crystallising characteristics of the compositions of the invention may be determined by subjecting small samples of the composition to differential scanning calorimetry techniques in addition to the practical test of determining the fastest rate at which articles may be injection moulded whilst retaining dimensional stability and good surface properties. One technique which may be used on small samples to examine the compositions of the present invention is as follows. In order to remove residual crystallinity as far as possible a 10 mg sample of the composition (dried overnight at ca. 100° C.) was first heated significantly above the melting point of the polyester for 2 minutes and then quenched in liquid nitrogen. Thus the composition is melt pressed at 300° C. for 2 minutes prior to quenching in liquid nitrogen. The sample was then heated in a Perkin Elmer DSC-2 machine at 20° C./min until a temperature of 300° C. was reached. After leaving the sample at 300° C. for 2 minutes it was cooled at 20° C./minute. For a control sample of PET homopolymer the trace of the heat changes involved on heating the sample shows a glass-transition temperature (Tg) in the region of 70° C., a pronounced exotherm, as crystals tend to form from the glassy state, with a peak just below 150° C. (Tn) and a marked endotherm as the polymer melts (Tp) at about 260° C. On cooling, the temperature at which crystal growth starts (Ts) is readily observed as the start of an exotherm which has a maximum crystallisation rate at its peak (Tc). By comparison with this trace for polyethylene terephthalate a composition according to the invention would have a value for Tn of less than 120° C. and desirably less than 110° C. and Tc values which differ by less than 15° C. and desirably less than 10° C. In practice it has been found that Tn corresponds closely to the temperature at which the peak in the crystallisation curve is reached within 60 seconds under isothermal conditions.

Other variations of this test may be used as indicated in the Examples.

The intrinsic viscosity of the polyesters in the compositions of the invention are determined on a 1% solution of the polyester in o-chlorophenol measured at 25° C.

The invention is further illustrated by reference to the following examples.

EXAMPLE 1

A block copolyester containing blocks of PET and polyethylene oxide was prepared from a polyethylene glycol having a nominal molecular weight of 4000. The block polymer contained 10 weight % of the polyethylene oxide segments. This polymer was melt compounded with the various additives listed in Table 1 below. The Table also records the data obtained from the differential scanning calorimetry (DSC) studies, outlined above. For comparison purposes the Table includes data on a PET polymer and the polyethylene glycol (PEG 4000) used to prepare the block copolymer.

TABLE 1

| Additive | Differential Scanning Calorimetry Data (°C.) | | | | |
|---|---|---|---|---|---|
| | Tg | Tn | Tp | Ts | Tc |
| 1% 'Mistron Superfrost' Talc | 49 | 113.5 | 251 | 216 | 206 |
| 5% 'Surlyn'* 1601 | 48.5 | 104 | 251 | 213 | 207 |
| 30% glass fibre + 1% talc | 51.5 | 111 | 250.5 | 217 | 208 |
| 30% glass fibre + 5% 'Surlyn'* 1601 | 53.5 | 104 | 251 | 216 | 209.5 |
| None | 48 | 132 | 250 | 206 | 174 |
| Control PET (IV 0.65) | 30 | 133 | 249 | 209 | 190 |

*'Surlyn' 1601 - a partially neutralised ethylene/methacrylic acid copolymer (sodium salt).

These results indicate that the compositions containing talc as nucleant were less nucleated than those containing 'Surlyn' as shown by the lower Tn values of the latter.

In actual moulding of test pieces (melt temperature 280° C., mould temperature 110° C.) the lower Tn values for the 'Surlyn'-containing compositions resulted in smooth glossy mouldings compared with rough, dull mouldings for the talc nucleated compositions.

EXAMPLE 2

Composition containing equal parts by weight of the block copolymer used in Example 1 and a polyethylene terephthalate homopolymer having an intrinsic viscosity of 0.65 were blended together and with varius additives as listed in Table 2. The results obtained from a DSC study, using the procedure hereinbefore specified, are also included

TABLE 2

| Additive | Differential Scanning Calorimetry Data (°C.) | | | | |
|---|---|---|---|---|---|
| | Tg | Tn | Tp | Ts | Tc |
| None | 61 | 126 | 251 | 210 | 200 |
| 1% 'Mistron Superfrost' Talc | 64 | 119.5 | 250 | 215.5 | 205 |
| 5% 'Surlyn' 1601 | 59 | 109 | 250 | 214 | 206 |

EXAMPLE 3

A block copolyester containing 2% by weight of polyethylene oxide units from a polyethylene glycol of nominal molecular weight 1500 (PEG 1500) was melt compounded with the additives listed in Table 3. The results obtained from a DSC study using the procedure hereinbefore specified are listed in the table.

TABLE 3

| Additive | Differential Scanning Calorimetry Data (°C.) | | | | |
|---|---|---|---|---|---|
| | Tg | Tn | Tp | Ts | Tc |
| 1% 'Mistron Superfrost' Talc | 58 | 123.5 | 250.5 | 214 | 203 |
| 5% 'Surlyn' 1601 | 58 | 13 | 250.5 | 214 | 206 |
| 1% talc + 30% glass fibre + 3% neopentyl glycol dibenzoate | 57 | 117 | 249.5 | 214 | 204.5 |
| 5% 'Surlyn' 1601 + 30% glass fibre + 3% neopentyl glycol dibenzoate | 57 | 107 | 250 | 214 | 208 |
| None | 63 | 143 | 250 | 207 | 188 |

EXAMPLE 4

A copolyester containing blocks of PET and 5% by weight of blocks of polyethylene oxide (derived from polyethylene glycol of nominal molecular weight = 1540) was blended with 30% by weight of 3 mm long glass fibre and various levels of 'Surlyn' 1601 by tumbling. The mixture was compounded in a screw extruder. The crystallisation properties of the product obtained was assessed by measuring the Tn value of the composition as previously described. Physical properties were measured on test pieces formed from the composition. The results obtained are recorded in Table 4.

TABLE 4

| 'Surlyn' 1601 content % by weight of total composition | DSC results | | Flexural* modulus | Tensile** strength | Impact strength*** | |
|---|---|---|---|---|---|---|
| | Tg | Tn | | | notched (¼ mm) | un-notched |
| 1 | 60 | 118 | 11.5 | 157 | 10 | 58 |
| 5 | 60 | 109 | 10.4 | 145 | 11 | 57 |

*measured according to ASTM D 790-72
**measured according to ASTM D 638-72
***measured according to ASTM D 256-73

EXAMPLE 5

A block copolyester containing 10% by weight of blocks of PET and polyethylene oxide was prepared using a polyethylene glycol of nominal molecular weight 1540. The copolyester was compounded with 30% by weight of 3 mm glass fibres and the various levels of 'Surlyn' 1601 listed below. Table 5 below records values of Tg and Tn obtained from DSC measurements as previously described and other physical properties.

TABLE 5

| 'Surlyn' 1601 content % by weight of total composition | DSC results | | Flexural* modulus | Tensile** Strength | Charpy*** impact strength notched (¼ mm Izod) |
|---|---|---|---|---|---|
| | Tg | Tn | | | |
| 1 | 51 | 106 | 8.6 | 150 | 86 |
| 5 | 52 | 91 | 8.0 | 144 | 111 |

*measured according to ISO Method R 178
**measured according to ISO Method R 527
***measured according to ISO Method R 180A

EXAMPLE 6

A block copolyester containing 10% by weight of blocks of polytetramethylene oxide units was prepared using polytetramethylene glycol. The copolyester was compounded together with 30% by weight of glass fibres (3 mm) and 5% by weight of 'Surlyn' 1601.

DSC measurements indicated values of Tg and Tn of 47° C. and 99° C. respectively.

EXAMPLE 7

In this example a composition (hereinafter termed Comparative Composition A) according to British Patent Publication No. 2,015,014 containing 30% by weight of glass fibre, 5% by weight of a partially neutralised sodium salt of an ethylene/methacrylic acid copolymer, 5.5% by weight of neopentylglycol dibenzoate, 0.2% by weight of tetrabis[methylene(3,5di-tert-butyl-4-hydroxyhydrocinnamate)] methane as stabiliser and the balance (59.3% by weight) of PET with an intrinsic viscosity of 0.63 is compared with a similar composition (hereinafter termed Composition B) except in that the neopentylglycol dibenzoate was omitted and the PET was replaced with a copolyester of blocks of PET and 5% by weight of blocks of polyethylene oxide. The polymer content of the second composition was 64.8% by weight.

The crystallisation properties of the two compositions were assessed by the DSC techniques previously described. The results detailed in Table 6 indicate a slightly lower value of Tn for the composition according to the invention. This difference is shown more clearly when comparing the half crystallisation times under isothermal conditions. Although there is little difference at high temperatures the results indicate that Composition B would crystallise considerably more quickly at a mould temperature of 90° C. than Comparative Composition A.

TABLE 6

| | Tg | Tn | DSC measurements Half crystallisation times (min) | | | |
|---|---|---|---|---|---|---|
| | | | at 90° C. | 100° C. | 110° C. | 120° C. |
| Comparative Composition A | 65 | 110 | 10.0 | 1.2 | 0.52 | 0.25 |
| Composition B | 61 | 108 | 2.8 | 0.7 | 0.3 | 0.23 |

The two compositions were moulded on Ankerwerke A36 injection moulding machine into plaques of dimensions 75 mm×50 mm×3 mm. The plaques were prepared using a melt temperature in the range 280° C. to 290° C. and at mould temperatures of 90° C. and 110° C. Very noticeable fuming was observed during the moulding of Comparative Composition A which was absent in the case of Composition B. Examination of the mould surface showed that Comparative Composition A had left a deposit in the mould. The mouldings obtained for Composition B had significantly better surface finish than Comparative Composition A particularly when moulded at a mould temperature in excess of 90° C.

The physical properties measured on the mouldings are recorded in Table 7.

TABLE 7

| Composition | Moulding Conditions | | Flexural modulus (GN/m$^2$) | Charpy impact | |
|---|---|---|---|---|---|
| | Melt temp. (°C.) | Mould temp. (°C.) | | NIS (kJ/m$^2$) | UNIS (kJ/m$^2$) |
| Comparative Composition A | 280 | 110 | 10.5 | 10.4 | 25 |
| | 280 | 90 | 10.7 | 9.2 | 35 |
| Composition B | 280 | 110 | 9.3 | 10.3 | 38 |
| | 280 | 90 | 9.1 | 10.3 | 52 |

As expected the flexural modulus of Composition B is lower than that of Comparative Composition A because of the presence of the low Tg blocks in the former. On the other hand unnotched impact strength of Composition B was superior to that of Comparative Composition A.

In further comparative mouldings of large dimensions it was observed that under severe conditions Composition B was less susceptible to degradation (as indicated by the appearance of dark coloured streaks in the moulding) than was Comparative Composition A. This superior thermal stability was confirmed by ageing the compositions in air. At temperatures in excess of 140° C. Comparative Composition A became discoloured considerably more quickly than Composition B.

EXAMPLE 8

A block copolyester containing blocks of PET and polyethylene oxide was prepared from a polyethylene glycol having a nominal molecular weight of 4000. The block copolyester contained 30% by weight of the polyethylene oxide segments. The copolyester was compounded with 5% by weight of the total composition of 'Surlyn' 1706 (a partially neutralised ethylene/methacrylic acid, zinc salt). The Tn value of the composition was determined as follows. After drying a sample of the product overnight at 100° C. to 110° C. in a vacuum oven a film (0.375 mm thick) was obtained by pressing the product between PTFE coated stainless steel glazing plates at a pressure of 18 MPa and a temperature of 280° C. After 1 minute at the required pressure the mould was quenched in an ice-batch. About 10 mg of sample was cut from the film and heated in a Perkin Elmer DSC 2 machine at a rate of 16° C./minute. A Tn value of 64° C. was observed compared with a value of 71° C. for the copolyester not containing the 'Surlyn' additive.

I claim:

1. A fast crystallising polyester composition comprising a block copolyester containing the repeating polymeric segments A and B wherein A is a polymeric segement of ethylene terephthalate units and B is a polymeric segment having a molecular weight in the range 500 to 10,000 and a glass-transition temperature of less than 0° C. the concentration of the segments of B being between 0.05 and 10 mole % of the block copolyester and being selected from the group consisting of polyoxyalkylene glycols and wholly aliphatic polyesters, and 0.1 to 50% by weight of the composition of a crystallisation nucleant which is an at least partially neutralised salt of an ethylenically unsaturated polymer containing pendant carboxyl groups or anhydrides thereof.

2. A fast crystallising polyester composition according to claim 1 in which the salt is an alkali metal salt.

3. A fast crystallising polyester composition according to claim 1 containing from 5 to 80% by weight of the composition of glass fibres.

4. A fast crystallising polyester composition according to claim 1 in which the molecular weight of the polymeric segment B having a glass-transition temperature of less than 0° C. is between 1000 and 5000.

5. A fast crystallising polyester composition according to claim 1 wherein the polymeric segments B have a glass-transition temperature less than −20° C.

6. A fast crystallising polyester composition according to either claim 1 or claim 5 which contains from 0.1 to 5 mole % of polymeric segments B.

7. A fast crystallising polyester composition according to claim 1 which contains from 0.5 to 10% by weight of the composition of the crystallisation nucleant.

* * * * *

REEXAMINATION CERTIFICATE (836th)
United States Patent [19]
Nield

[11] B1 4,322,335
[45] Certificate Issued  Apr. 5, 1988

[54] FAST CRYSTALLIZING BLOCK COPOLYESTER COMPOSITION

[75] Inventor: Eric Nield, Watton-at-Stone, England

[73] Assignee: Imperial Chemical Industries Limited, London, England

Reexamination Request:
No. 90/001,064, Aug. 4, 1986

Reexamination Certificate for:
Patent No.: 4,322,335
Issued: Mar. 30, 1982
Appl. No.: 184,975
Filed: Sep. 8, 1980

[30] Foreign Application Priority Data

Sep. 21, 1979 [GB] United Kingdom ............... 32818/79

[51] Int. Cl.$^4$ .......................... C08K 3/40; C08L 67/02
[52] U.S. Cl. ...................... 523/522; 523/523; 524/505; 525/176; 525/408
[58] Field of Search ............. 523/522; 525/176, 408; 528/301; 524/505, 513

[56] References Cited

U.S. PATENT DOCUMENTS

| | | | |
|---|---|---|---|
| 3,435,093 | 3/1969 | Cope | 525/166 |
| 3,639,527 | 2/1972 | Brinkmann et al. | 525/64 |
| 3,651,014 | 3/1972 | Witsiepe | 528/274 |
| 3,663,653 | 5/1972 | Frohlich et al. | 528/308.7 |
| 3,763,109 | 10/1973 | Witsiepe | 528/274 |
| 3,766,146 | 10/1973 | Witsiepe | 528/274 |
| 4,010,222 | 3/1977 | Shih | 264/95 |

FOREIGN PATENT DOCUMENTS

| | | |
|---|---|---|
| 1523219 | 8/1978 | United Kingdom . |
| 2015013 | 9/1979 | United Kingdom . |

OTHER PUBLICATIONS

Kunstsoff-Handbuch, Band VIII, Polyester, 1973, pp. 699–703.

D. Coleman, Block Copolymers: Copolymerization of Ethylene Terephthalate and Polyoxyethylene Glycols, XIV, pp. 15–28.

J. B. Jackson et al, The Crystallization of Poly(ethylene terephthalate) and Related Copolymers, Polymer, 10(11), pp. 873–884 (1969).

*Primary Examiner*—L. T. Jacobs

[57] ABSTRACT

A fast crystallizing polyester composition comprising a block copolyester containing the repeating polymeric segments A and B wherein A is a polymeric segment of ethylene terephthalate units and B is a polymeric segment having a glass-transition temperature of less than 0° C. and preferably less than −20° C., the concentration of the segments of B being between 0.05 and 10 mole % of the block copolyester, and a crystallization nucleant which is an at least partially neutralized salt, preferably an alkali metal salt, of a polymer containing pendant neutralizable groups.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 is confirmed.

New claims 8 and 9 are added and determined to be patentable.

*8. A fast crystallising polyester composition according to claim 1 containing up to 10% by weight of the block copolymer of polymeric segments B.*

*9. A fast crystallising polyester composition according to claim 1 having a differential scanning calorimetry Tn value of less than 120° C. measured on heating a previously quenched sample of the composition at a heating rate of 20° C./min.*

* * * * *